United States Patent
Zhao et al.

(10) Patent No.: US 9,344,975 B2
(45) Date of Patent: May 17, 2016

(54) POWER ADJUSTMENT METHOD AND DEVICE

(71) Applicant: Huawei Technologies Co., Ltd., Shenzhen (CN)

(72) Inventors: Yueying Zhao, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/701,287

(22) Filed: Apr. 30, 2015

(65) Prior Publication Data

US 2015/0237588 A1    Aug. 20, 2015

Related U.S. Application Data

(63) Continuation of application No. PCT/CN2012/083835, filed on Oct. 31, 2012.

(51) Int. Cl.
*H04B 7/00*     (2006.01)
*H04W 52/24*    (2009.01)
*H04W 24/08*    (2009.01)
*H04B 15/00*    (2006.01)

(52) U.S. Cl.
CPC ............ *H04W 52/244* (2013.01); *H04W 24/08* (2013.01)

(58) Field of Classification Search
CPC ..... H04W 52/04; H04W 52/08; H04W 52/24; H04W 52/241; H04W 52/244

USPC .................................................. 455/69, 522
See application file for complete search history.

(56) References Cited

U.S. PATENT DOCUMENTS

| | | |
|---|---|---|
| 2005/0277419 A1 | 12/2005 | Takano et al. |
| 2008/0146154 A1 | 6/2008 | Claussen et al. |
| 2009/0286545 A1 | 11/2009 | Yavuz et al. |
| 2010/0087202 A1 | 4/2010 | Ventola et al. |
| 2011/0207419 A1* | 8/2011 | Wang ............... H04W 52/16 455/115.1 |
| 2014/0010198 A1 | 1/2014 | Wang et al. |

FOREIGN PATENT DOCUMENTS

| | | |
|---|---|---|
| CN | 101136666 A | 3/2008 |
| CN | 101574000 A | 11/2009 |
| CN | 101741431 A | 6/2010 |
| CN | 102027787 A | 4/2011 |
| WO | 2011126417 A1 | 10/2011 |
| WO | 2012079045 A1 | 6/2012 |

* cited by examiner

*Primary Examiner* — Lee Nguyen
(74) *Attorney, Agent, or Firm* — Slater Matsil, LLP

(57) ABSTRACT

Embodiments of the present invention provide a power adjustment method and device. The method includes determining an increment of a signal-to-interference ratio target value of a serving cell of a UE according to a difference between pilot signal power of a macro base station and pilot signal power of a micro base station. The serving cell of the UE is at least one of a macro cell in which the macro base station is located and a micro cell in which the micro base station is located. The method also includes, after increasing the signal-to-interference ratio target value by the increment, sending an increased signal-to-interference ratio target value to a base station in the serving cell of the UE.

20 Claims, 5 Drawing Sheets

---

Determine an increment of a signal-to-interference ratio target value of a serving cell of a UE according to a difference between pilot signal power of a macro base station and pilot signal power of a micro base station, where the serving cell of the UE is at least one cell of a macro cell in which the macro base station is located and a micro cell in which the micro base station is located — 100

After increasing the signal-to-interference ratio target value by the increment, send an increased signal-to-interference ratio target value to a base station in the serving cell of the UE, so that the base station in the serving cell of the UE controls the UE to increase transmit power of an HS-DPCCH — 200

POWER ADJUSTMENT METHOD AND DEVICE

This application is a continuation of International Application No. PCT/CN2012/083835, filed on Oct. 31, 2012, which is hereby incorporated by reference in entirety.

TECHNICAL FIELD

The present invention relates to communications technologies, and in particular, to a power adjustment method and device.

BACKGROUND

In an existing macro cellular network, because a cell radius is generally large, coverage is hardly available to a user located in an area on an edge, and performance cannot be ensured. Moreover, in a hotspot traffic area of a macro cell, a situation in which experience of some users cannot be ensured also exists because there is a large quantity of users. However, emergence of a heterogeneous network (Hetnet for short; also referred to as a macro-micro network) solves a problem that performance of a user cannot be ensured in the macro cellular network. In a heterogeneous network topology, a micro cell may be used to fill a coverage hole of a macro cell, or a micro cell may be used to absorb traffic in a hotspot traffic area of the macro cell. In this way, a cell capacity can be improved so as to ensure user experience.

In the heterogeneous network, transmit power of a micro cell base station is lower than transmit power of a macro cell base station (transmit power of a macro base station is generally 43 dBm, and transmit power of a micro base station is generally 37 dBm or 30 dBm). Therefore, a balancing point of uplink power is different from that of downlink power, that is, a point at which downlink power from a macro base station to a user equipment (UE for short) is the same as downlink power from a micro base station to the user equipment is different from a point at which uplink power from the UE to the macro base station is the same as uplink power from the UE to the micro base station. Therefore, a soft handover area may also exist. In the soft handover area, power of the UE is controlled by both the micro base station and the macro base station, and a criterion for power control is as follows:

The UE makes a response by performing a power decreasing operation as long as a cell in an active set sends a "power decreasing" instruction. The UE makes a response by performing a power increasing operation only when all cells send a "power increasing" instruction to the UE. However, in the heterogeneous network, when the UE is located in a soft handover area in which a macro cell serves as a serving cell and a micro cell serves as a non-serving cell, High Speed Downlink Packet Access (HSDPA for short) data is sent by the macro base station, and an information feedback of a high speed dedicated physical control channel (HS-DPCCH for short) is sent to the macro base station; however, still in this soft handover area, uplink power from the UE to the micro base station is higher than that from the UE to the macro base station, and therefore, the UE is subject to "power decreasing" control of the micro base station. As a result, power of HS-DPCCH received by the macro base station is extremely low, which directly affects HS-DPCCH demodulation performance.

To improve the HS-DPCCH demodulation performance, in the prior art, a power offset of the HS-DPCCH is generally raised. However, the power offset of the HS-DPCCH is limited, and in some cases, even though a largest power offset is configured for the HS-DPCCH, a requirement of the HS-DPCCH demodulation performance cannot be met.

SUMMARY

Embodiments of the present invention provide a power adjustment method and device, which are used for improving HS-DPCCH demodulation performance when a UE is located in a soft handover area.

According to a first aspect, a power adjustment method is provided. An increment of a signal-to-interference ratio target value of a serving cell of a user equipment (UE) is determined according to a difference between pilot signal power of a macro base station and pilot signal power of a micro base station. The serving cell of the UE is at least one of a macro cell in which the macro base station is located and a micro cell in which the micro base station is located. After increasing the signal-to-interference ratio target value by the increment, an increased signal-to-interference ratio target value is sent to a base station in the serving cell of the UE, so that the base station in the serving cell of the UE controls the UE to increase transmit power of a high speed dedicated physical control channel (HS-DPCCH).

In a first possible implementation manner of the first aspect, before the determining an increment of a signal-to-interference ratio target value of a serving cell of UE according to a difference between pilot signal power of a macro base station and pilot signal power of a micro base station, the method includes: receiving the pilot signal power that is reported by the UE and is of the macro base station and the pilot signal power that is reported by the UE and is of the micro base station; or receiving the pilot signal power of the macro base station that is reported by the macro base station, and receiving the pilot signal power of the micro base station that is reported by the micro base station.

With reference to the first aspect or the first possible implementation manner of the first aspect, in a second possible implementation manner of the first aspect, the determining an increment of a signal-to-interference ratio target value of a serving cell of a UE according to a difference between pilot signal power of a macro base station and pilot signal power of a micro base station includes: using the difference between the pilot signal power of the macro base station and the pilot signal power of the micro base station as a parameter of a preset first function, and calculating the increment of the signal-to-interference ratio target value of the serving cell of the UE by using the first function, where the first function is a decreasing function of the difference between the pilot signal power of the macro base station and the pilot signal power of the micro base station.

With reference to the first aspect, or the first possible implementation manner of the first aspect, or the second possible implementation manner of the first aspect, in a third possible implementation manner of the first aspect, the determining an increment of a signal-to-interference ratio target value of a serving cell of a UE according to a difference between pilot signal power of a macro base station and pilot signal power of a micro base station includes: determining that the UE is located in a soft handover area in which the macro cell serves as the serving cell and the micro cell serves as a non-serving cell; and determining the increment of the signal-to-interference ratio target value of the macro cell according to the difference between the pilot signal power of the macro base station and the pilot signal power of the micro base station.

With reference to the first aspect, or the first possible implementation manner of the first aspect, or the second possible implementation manner of the first aspect, or the third possible implementation manner of the first aspect, in a fourth possible implementation manner of the first aspect, after the increasing the signal-to-interference ratio target value by the increment, the method further includes: sending gain factor configuration information to the UE, so that the UE re-determines a gain factor of an enhanced dedicated physical data channel (E-DPDCH) according to the gain factor configuration information, where a re-determined gain factor of the E-DPDCH is less than a gain factor of the E-DPDCH that is determined by the UE before the UE receives the gain factor configuration information.

With reference to the fourth possible implementation manner of the first aspect, in a fifth possible implementation manner of the first aspect, the power adjustment method further includes: sending the gain factor configuration information to the base station in the serving cell of the UE, so that the base station in the serving cell of the UE re-determines a mapping relationship between a data block length and the gain factor of the E-DPDCH according to the gain factor configuration information.

With reference to the fourth possible implementation manner of the first aspect, or the fifth possible implementation manner of the first aspect, in a sixth possible implementation manner of the first aspect, the gain factor configuration information is a first reference gain factor, and the first reference gain factor is less than a second reference gain factor used by the UE before the UE receives the gain factor configuration information. In another embodiment, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information.

In another embodiment, the gain factor configuration information is a second function, and the second function is used to decrease the gain factor of the E-DPDCH that is determined by the UE before the UE receives the gain factor configuration information. In another embodiment, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function.

According to a second aspect, a power adjustment method is provided. A user equipment (UE) receives gain factor configuration information sent by a network side device. The UE re-determines a gain factor of an enhanced dedicated physical data channel (E-DPDCH) according to the gain factor configuration information. The gain factor of the E-DPDCH that is re-determined by the UE is less than a gain factor of the E-DPDCH that is determined by the UE before the UE receives the gain factor configuration information.

In a first possible implementation manner of the second aspect, the gain factor configuration information is a first reference gain factor, and the first reference gain factor is less than a second reference gain factor used by the UE before the UE receives the gain factor configuration information; and the re-determining, by the UE, a gain factor of an enhanced dedicated physical data channel E-DPDCH according to the gain factor configuration information includes: re-determin ing, by the UE, the gain factor of the E-DPDCH according to a formula $$\beta_{ed,i,harq} = \beta'_{ed,ref}\sqrt{\frac{L'_{e,ref}}{L_{e,i}}}\sqrt{\frac{K_{e,i}}{K'_{e,ref}}} \cdot 10^{\left(\frac{\Delta harq}{20}\right)},$$

where $\beta_{ed,i,harq}$ is the re-determined gain factor of the E-DPDCH; $\beta'_{ed,ref}$ is the first reference gain factor; $L'_{e,ref}$ is a quantity of first reference code channels; $L_{e,i}$ is a quantity of code channels of an E-DPDCH data block of the re-determined gain factor; $K_{e,i}$ is a block length of the E-DPDCH data block of the re-determined gain factor; $K'_{e,ref}$ is a first reference data block length; and $\Delta harq$ is a HARQ offset of the E-DPDCH.

In a second possible implementation manner of the second aspect, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information; and the re-determining, by the UE, a gain factor of an enhanced dedicated physical data channel E-DPDCH according to the gain factor configuration information includes: re-determining, by the UE, the gain factor of the E-DPDCH according to a formula $$\beta_{ed,i,harq} = \sqrt{\frac{L'_{e,ref,1}}{L_{e,i}}} \cdot \sqrt{\left(\left(\frac{\frac{L'_{e,ref,2}}{L'_{e,ref,1}}\beta'^2_{ed,ref,2} - \beta'^2_{ed,ref,1}}{K'_{e,ref,2} - K'_{e,ref,1}}\right)(K_{e,i} - K'_{e,ref,1}) + \beta'^2_{ed,ref,1}\right)} \cdot 10^{\left(\frac{\Delta harq}{20}\right)},$$

where $\beta_{ed,i,harq}$ is the re-determined gain factor of the E-DPDCH; $L_{e,i}$ is a quantity of code channels of an E-DPDCH data block of the re-determined gain factor; $K_{e,i}$ is a block length of the E-DPDCH data block of the re-determined gain factor; $L'_{e,ref,1}$ is a quantity of first primary reference code channels; $L'_{e,ref,2}$ is a quantity of first secondary reference code channels; $\beta'_{ed,ref,1}$ is the first primary reference gain factor; $\beta'_{ed,ref,2}$ is the first secondary reference gain factor; $K'_{e,ref,1}$ is the first primary reference block length; $K'_{e,ref,2}$ is a first secondary reference block length; and $\Delta harq$ is a HARQ offset of the E-DPDCH.

In a third possible implementation manner of the second aspect, the gain factor configuration information is a second function, and the second function is used to decrease the gain factor of the E-DPDCH that is determined by the UE before the UE receives the gain factor configuration information; and the re-determining, by the UE, a gain factor of an enhanced dedicated physical data channel E-DPDCH according to the gain factor configuration information includes: multiplying, by the UE, the second function by the gain factor of the E-DPDCH channel that is determined by the UE before the UE receives the gain factor configuration information, so as to re-determine the gain factor of the E-DPDCH channel.

In a fourth possible implementation manner of the second aspect, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function; and the re-determining, by the UE, a gain factor of an enhanced dedicated physical data channel E-DPDCH according to the gain factor configuration information includes: using, by the UE, the second reference gain factor as a parameter, and calculating a third reference gain factor by using the third function; and re-determining, by the UE, the gain factor of the E-DPDCH by using the third reference gain factor.

According to a third aspect, a network side device is provided. A determining module is configured to determine an increment of a signal-to-interference ratio target value of a serving cell of a user equipment (UE) according to a difference between pilot signal power of a macro base station and pilot signal power of a micro base station. The serving cell of the UE is at least one of a macro cell in which the macro base station is located and a micro cell in which the micro base station is located. A first sending module is configured to, after the signal-to-interference ratio target value is increased by the increment, send an increased signal-to-interference ratio target value to a base station in the serving cell of the UE, so that the base station in the serving cell of the UE controls the UE to increase transmit power of a high speed dedicated physical control channel (HS-DPCCH).

In a first possible implementation manner of the third aspect, the network side device further includes: a receiving module, configured to: before the determining module determines the increment, receive the pilot signal power that is reported by the UE and is of the macro base station and the pilot signal power that is reported by the UE and is of the micro base station; or receive the pilot signal power of the macro base station that is reported by the macro base station, and receive the pilot signal power of the micro base station that is reported by the micro base station.

With reference to the third aspect, or the first possible implementation manner of the third aspect, in a second possible implementation manner of the third aspect, the determining module is specifically configured to use the difference between the pilot signal power of the macro base station and the pilot signal power of the micro base station as a parameter of a preset first function, and calculate the increment of the signal-to-interference ratio target value of the serving cell of the UE by using the first function, where the first function is a decreasing function of the difference between the pilot signal power of the macro base station and the pilot signal power of the micro base station.

With reference to the third aspect, or the first possible implementation manner of the third aspect, or the second possible implementation manner of the third aspect, in a third possible implementation manner of the third aspect, the determining module is specifically configured to determine that the UE is located in a soft handover area in which the macro cell serves as the serving cell and the micro cell serves as a non-serving cell, and determine the increment of the signal-to-interference ratio target value of the macro cell according to the difference between the pilot signal power of the macro base station and the pilot signal power of the micro base station.

With reference to the third aspect, or the first possible implementation manner of the third aspect, or the second possible implementation manner of the third aspect, or the third possible implementation manner of the third aspect, in a fourth possible implementation manner of the third aspect, the network side device further includes: a second sending module, configured to: after the signal-to-interference ratio target value is increased by the increment, send gain factor configuration information to the UE, so that the UE re-determines a gain factor of an enhanced dedicated physical data channel (E-DPDCH) according to the gain factor configuration information, where the re-determined gain factor of the E-DPDCH is less than a gain factor of the E-DPDCH that is determined by the UE before the UE receives the gain factor configuration information.

With reference to the fourth possible implementation manner of the third aspect, in a fifth possible implementation manner of the third aspect, the network side device further includes: a third sending module, configured to send the gain factor configuration information to the base station in the serving cell of the UE, so that the base station in the serving cell of the UE re-determines a mapping relationship between a data block length and the gain factor of the E-DPDCH according to the gain factor configuration information.

With reference to the fourth possible implementation manner of the third aspect, or the fifth possible implementation manner of the third aspect, in a sixth possible implementation manner of the third aspect, the gain factor configuration information is a first reference gain factor, and the first reference gain factor is less than a second reference gain factor used by the UE before the UE receives the gain factor configuration information. In another embodiment, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information. In another embodiment, the gain factor configuration information is a second function, and the second function is used to decrease the gain factor of the E-DPDCH that is determined by the UE before the UE receives the gain factor configuration information. In another embodiment, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function.

According to a fourth aspect, a network device is provided. A processor, configured to determine an increment of a signal-to-interference ratio target value of a serving cell of a user equipment (UE) according to a difference between pilot signal power of a macro base station and pilot signal power of a micro base station, and to increase the signal-to-interference ratio target value by the increment. The serving cell of the UE is at least one of a macro cell in which the macro base station is located and a micro cell in which the micro base station is located. A transmitter is configured to send a signal-to-interference ratio target value increased by the increment to a base station in the serving cell of the UE, so that the base station in the serving cell of the UE controls the UE to increase transmit power of a high speed dedicated physical control channel (HS-DPCCH).

In first possible implementation manner of the fourth aspect, the network side device further includes a receiver, configured to: before the processor determines the increment, receive the pilot signal power that is reported by the UE and is of the macro base station and the pilot signal power that is reported by the UE and is of the micro base station; or receive the pilot signal power of the macro base station that is reported by the macro base station, and receive the pilot signal power of the micro base station that is reported by the micro base station.

With reference to the fourth aspect, or the first possible implementation manner of the fourth aspect, in a second possible implementation manner of the fourth aspect, the processor is specifically configured to use the difference between the pilot signal power of the macro base station and the pilot signal power of the micro base station as a parameter of a preset first function, and calculate the increment of the signal-to-interference ratio target value of the serving cell of the UE by using the first function, where the first function is a decreasing function of the difference between the pilot signal power of the macro base station and the pilot signal power of the micro base station.

With reference to the fourth aspect, or the first possible implementation manner of the fourth aspect, or the second possible implementation manner of the fourth aspect, in a third possible implementation manner of the fourth aspect, the processor is specifically configured to determine that the UE is located in a soft handover area in which the macro cell serves as the serving cell and the micro cell serves as a non-serving cell, and determine the increment of the signal-to-interference ratio target value of the macro cell according to the difference between the pilot signal power of the macro base station and the pilot signal power of the micro base station.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the transmitter is further configured to: after the processor increases the signal-to-interference ratio target value by the increment, send gain factor configuration information to the UE, so that the UE re-determines a gain factor of an enhanced dedicated physical data channel (E-DPDCH) according to the gain factor configuration information, where the re-determined gain factor of the E-DPDCH is less than a gain factor of the E-DPDCH that is determined by the UE before the UE receives the gain factor configuration information.

With reference to the fourth possible implementation manner of the fourth aspect, in a fifth possible implementation manner of the fourth aspect, the transmitter is further configured to send the gain factor configuration information to the base station in the serving cell of the UE, so that the base station in the serving cell of the UE re-determines a mapping relationship between a data block length and the gain factor of the E-DPDCH according to the gain factor configuration information.

With reference to the fourth possible implementation manner of the fourth aspect, or the fifth possible implementation manner of the fourth aspect, in a sixth possible implementation manner of the fourth aspect, the gain factor configuration information is a first reference gain factor, and the first reference gain factor is less than a second reference gain factor used by the UE before the UE receives the gain factor configuration information. In another embodiment, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information. In another embodiment, the gain factor configuration information is a second function, and the second function is used to decrease the gain factor of the E-DPDCH that is determined by the UE before the UE receives the gain factor configuration information. In another embodiment, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function.

According to a fifth aspect, a user equipment (UE) is provided. A receiving module is configured to receive gain factor configuration information sent by a network side device. A determining module is configured to re-determine a gain factor of an enhanced dedicated physical data channel (E-DPDCH) according to the gain factor configuration information. The gain factor of the E-DPDCH that is re-determined by the UE is less than a gain factor of the E-DPDCH that is determined by the UE before the UE receives the gain factor configuration information.

In a first possible implementation manner of the fifth aspect, the gain factor configuration information is a first reference gain factor, and the first reference gain factor is less than a second reference gain factor used by the UE before the UE receives the gain factor configuration information; and the determining module is specifically configured to re-determine the gain factor of the E-DPDCH according to a formula $$\beta_{ed,i,harq} = \beta'_{ed,ref} \sqrt{\frac{L'_{e,ref}}{L_{e,i}}} \sqrt{\frac{K_{e,i}}{K'_{e,ref}}} \cdot 10^{\left(\frac{\Delta harq}{20}\right)},$$

where $\beta_{ed,i,harq}$ is the re-determined gain factor of the E-DPDCH; $\beta'_{ed,ref}$ is the first reference gain factor; $L'_{e,ref}$ is a quantity of first reference code channels; $L_{e,i}$ is a quantity of code channels of an E-DPDCH data block of the re-determined gain factor; $K_{e,i}$ is a block length of the E-DPDCH data block of the re-determined gain factor; $K'_{e,ref}$ is a first reference data block length; and $\Delta harq$ is a HARQ offset of the E-DPDCH.

In a second possible implementation manner of the fifth aspect, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information; and the determining module is specifically configured to re-determine the gain factor of the E-DPDCH according to a formula $$\beta_{ed,i,harq} = \sqrt{\frac{L'_{e,ref,1}}{L_{e,i}}} \cdot$$

$$\sqrt{\left(\left(\frac{\frac{L'_{e,ref,2}}{L'_{e,ref,1}}\beta'^2_{ed,ref,2} - \beta'^2_{ed,ref,1}}{K'_{e,ref,2} - K'_{e,ref,1}}\right)(K_{e,i} - K'_{e,ref,1}) + \beta'^2_{ed,ref,1}\right)} \cdot 10^{\left(\frac{\Delta harq}{20}\right)},$$

where $\beta_{ed,i,harq}$ is the re-determined gain factor of the E-DPDCH; $L_{e,i}$ is a quantity of code channels of an E-DPDCH data block of the re-determined gain factor; $K_{e,i}$ is a block length of the E-DPDCH data block of the re-determined gain factor;

$L'_{e,ref,1}$ is a quantity of first primary reference code channels; $L'_{e,ref,2}$ is a quantity of first secondary reference code channels; $\beta'_{ed,ref,1}$ is the first primary reference gain factor; $\beta'_{ed,ref,2}$ is the first secondary reference gain factor; $K'_{e,ref,1}$ is the first primary reference block length; $K'_{e,ref,2}$ is a first secondary reference block length, and, and Δharq is a HARQ offset of the E-DPDCH.

In a third possible implementation manner of the fifth aspect, the gain factor configuration information is a second function, and the second function is used to decrease the gain factor of the E-DPDCH that is determined by the UE before the UE receives the gain factor configuration information; and the determining module is specifically configured to multiply the second function by the gain factor of the E-DPDCH channel that is determined by the UE before the UE receives the gain factor configuration information, so as to re-determine the gain factor of the E-DPDCH channel.

In a fourth possible implementation manner of the fifth aspect, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function; and the determining module is specifically configured to use the second reference gain factor as a parameter, calculate a third reference gain factor by using the third function, and re-determine the gain factor of the E-DPDCH by using the third reference gain factor.

According to a sixth aspect, a user equipment (UE) is provided. A receiver is configured to receive gain factor configuration information sent by a network side device. A processor is configured to re-determine a gain factor of an enhanced dedicated physical data channel (E-DPDCH) according to the gain factor configuration information. The gain factor of the E-DPDCH that is re-determined by the UE is less than a gain factor of the E-DPDCH that is determined by the UE before the UE receives the gain factor configuration information.

In a first possible implementation manner of the sixth aspect, the gain factor configuration information is a first reference gain factor, and the first reference gain factor is less than a second reference gain factor used by the UE before the UE receives the gain factor configuration information; and the processor is specifically configured to re-determine the gain factor of the E-DPDCH according to a formula $$\beta_{ed,i,harq} = \beta'_{ed,ref} \sqrt{\frac{L'_{e,ref}}{L_{e,i}}} \sqrt{\frac{K_{e,i}}{K'_{e,ref}}} \cdot 10^{(\frac{\Delta harq}{20})},$$

where $\beta_{ed,i,harq}$ is the re-determined gain factor of the E-DPDCH; $\beta'_{ed,ref}$ is the first reference gain factor; $L'_{e,ref}$ is a quantity of first reference code channels; $L_{e,i}$ is a quantity of code channels of an E-DPDCH data block of the re-determined gain factor; $K_{e,i}$ is a block length of the E-DPDCH data block of the re-determined gain factor; $K'_{e,ref}$ is a first reference data block length; and Δharq is a HARQ offset of the E-DPDCH.

In a second possible implementation manner of the sixth aspect, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information; and the processor is specifically configured to re-determine the gain factor of the E-DPDCH according to a formula $$\beta_{ed,i,harq} = \sqrt{\frac{L'_{e,ref,1}}{L_{e,i}}} \cdot$$

$$\sqrt{\left(\left(\frac{\frac{L'_{e,ref,2}}{L'_{e,ref,1}}\beta'^2_{ed,ref,2} - \beta'^2_{ed,ref,1}}{K'_{e,ref,2} - K'_{e,ref,1}}\right)(K_{e,i} - K'_{e,ref,1}) + \beta'^2_{ed,ref,1}\right) \cdot 10^{(\frac{\Delta harq}{20})}},$$

where $\beta_{ed,i,harq}$ is the re-determined gain factor of the E-DPDCH; $L_{e,i}$ is a quantity of code channels of an E-DPDCH data block of the re-determined gain factor; $K_{e,i}$ is a block length of the E-DPDCH data block of the re-determined gain factor; $L'_{e,ref,1}$ is a quantity of first primary reference code channels; $L'_{e,ref,2}$ is a quantity of first secondary reference code channels; $\beta'_{ed,ref,1}$ is the first primary reference gain factor; $\beta'_{ed,ref,2}$ is the first secondary reference gain factor; $K'_{e,ref,1}$ is a first primary reference block length; $K'_{e,ref,2}$ is a first secondary reference block length, and, and Δharq is a HARQ offset of the E-DPDCH.

In a third possible implementation manner of the sixth aspect, the gain factor configuration information is a second function, and the second function is used to decrease the gain factor of the E-DPDCH that is determined by the UE before the UE receives the gain factor configuration information; and the processor is specifically configured to multiply the second function by the gain factor of the E-DPDCH channel that is determined by the UE before the UE receives the gain factor configuration information, so as to re-determine the gain factor of the E-DPDCH channel.

In a fourth possible implementation manner of the sixth aspect, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function; and the processor is specifically configured to use the second reference gain factor as a parameter, calculate a third reference gain factor by using the third function, and re-determine the gain factor of the E-DPDCH by using the third reference gain factor.

According to the power adjustment method and device provided by the embodiments of the present invention, an increment of a signal-to-interference ratio target value of a serving cell of a UE is determined according to a difference between pilot signal power of a macro base station and pilot signal power of a micro base station; and then, after the signal-to-interference ratio target value is increased by the increment, an increased signal-to-interference ratio target value is sent to a base station in the serving cell of the UE, so that the base station in the serving cell of the UE controls the UE to increase transmit power of an HS-DPCCH. In this way, received quality of the HS-DPCCH is improved, thereby improving HS-DPCCH demodulation performance. The present invention is particularly applicable to improvement of the HS-DPCCH demodulation performance when the UE is located in a soft handover area.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
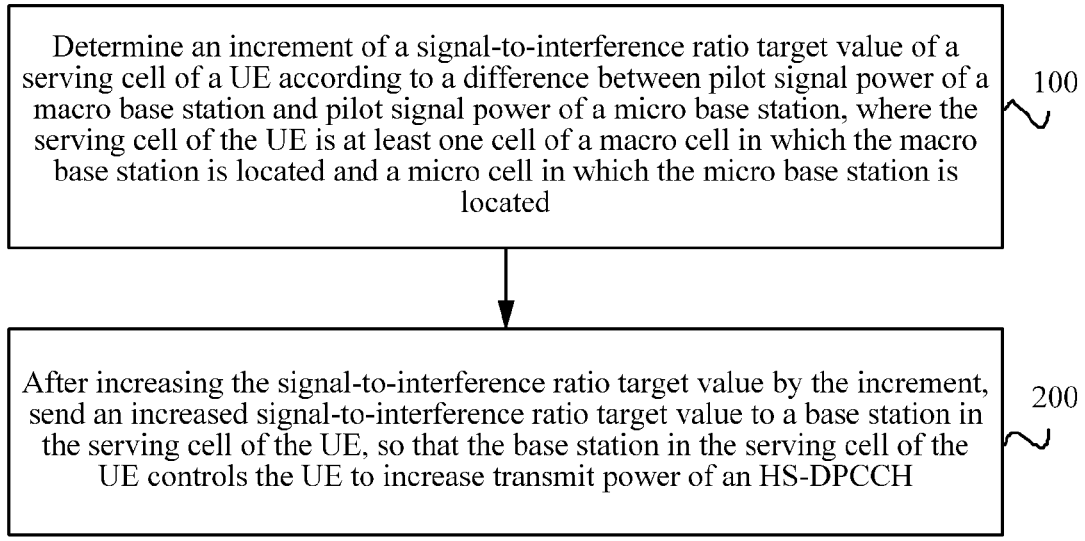
FIG. 1 is a flowchart of a power adjustment method according to an embodiment of the present invention.

FIG. 1 is a flowchart of a power adjustment method according to an embodiment of the present invention. As shown in FIG. 1, the method in this embodiment includes the following steps.

Step 100: Determine an increment of a signal-to-interference ratio target value (SIRtarget) of a serving cell of a UE according to a difference between pilot signal power of a macro base station and pilot signal power of a micro base station, where the serving cell of the UE is at least one of a macro cell in which the macro base station is located and a micro cell in which the micro base station is located.

Step 200: After increasing the signal-to-interference ratio target value by the increment, send an increased signal-to-interference ratio target value to a base station in the serving cell of the UE, so that the base station in the serving cell of the UE controls the UE to increase transmit power of an HS-DPCCH.

It is noted herein that a quantity of serving cells of the UE may vary with a quantity of carriers in a network, and each carrier corresponds to one serving cell. In a case in which there is only one carrier in the network, that is, in a single-carrier, the UE has one serving cell; specifically, the serving cell of the UE is one cell of a macro cell in which the macro base station is located and a micro cell in which the micro base station is located. In a case in which there are multiple carriers, that is, in a multi-carrier case, the UE has multiple serving cells, that is, the serving cells of the UE are multiple cells of a macro cell in which the macro base station is located and a micro cell in which the micro base station is located. This embodiment constitutes no limitation on which specific cell each serving cell of the UE is.

In addition, a quantity of HS-DPCCHs used by the UE for sending uplink data may vary with the quantity of carriers in the network. For example, in a case in which the quantity of carriers is 1, 2, 3, or 4, the UE requires one HS-DPCCH; for another example, in a case in which the quantity of carriers is 5, 6, 7, or 8, the UE requires two HS-DPCCHs. In addition, as the quantity of carriers increases, the UE requires an increasing quantity of HS-DPCCHs. For different HS-DPCCHs, processing manners of increasing transmit power of the HS-DPCCHs are the same; and a processing process of increasing transmit power of one HS-DPCCH is used as an example for description in various embodiments of the present invention.

If the serving cell of the UE is the macro cell in which the macro base station is located, the base station in the serving cell of the UE is the macro base station; if the serving cell of the UE is the micro cell in which the micro base station is located, the base station in the serving cell of the UE is the micro base station.

This embodiment is applicable to a heterogeneous network. This embodiment is executed by a device on a network side (hereinafter referred to as a network side device). The network side device may be a radio network controller (RNC for short), but is not limited thereto, for example, the network side device may also be a base station in a cell.

In any case in which HS-DPCCH demodulation performance is poor, the network side device can determine the increment of the signal-to-interference ratio target value of the serving cell of the UE according to the difference between the pilot signal power of the macro base station and the pilot signal power of the micro base station; and then, after increasing the signal-to-interference ratio target value by the increment, send the increased signal-to-interference ratio target value to the base station in the serving cell of the UE, so that the base station in the serving cell of the UE controls the UE to increase the transmit power of the HS-DPCCH, thereby ensuring the HS-DPCCH demodulation performance.

For example, if a current position of the UE is relatively close to the macro base station, the difference between the pilot signal power of the macro base station and the pilot signal power of the micro base station is relatively large, and the network side device may set the increment of the signal-to-interference ratio target value to a relatively small value, that is, the base station in the serving cell of the UE increases the signal-to-interference ratio target value by a relatively small value; conversely, if the current position of the UE is relatively close to the micro base station, the difference between the pilot signal power of the macro base station and the pilot signal power of the micro base station is relatively small, and the network side device may set the increment of the signal-to-interference ratio target value to a relatively large value, that is, the base station in the serving cell of the UE raises the signal-to-interference ratio target value by a relatively large value.

In an optional implementation manner, the pilot signal power of the macro base station and the pilot signal power of the micro base station that are used by the network side device may respectively be downlink pilot signal power of the macro base station and downlink pilot signal power of the micro base station. Based on this, before step 100, the method includes:

receiving, by the network side device, the pilot signal power of the macro base station and the pilot signal power of the micro base station that are reported by the UE. The pilot signal power of the macro base station and the pilot signal power of the micro base station that are obtained by measurement and reported by the UE are respectively the downlink pilot signal power of the macro base station and the downlink pilot signal power of the micro base station. A process in which the UE obtains, by measurement, the pilot signal power of the macro base station and the pilot signal power of the micro base station belongs to the prior art, and details are not described herein again.

In an optional implementation manner, the pilot signal power of the macro base station and the pilot signal power of the micro base station that are used by the network side device may respectively be uplink pilot signal power of the macro base station and uplink pilot signal power of the micro base station. Based on this, before step 100, the method includes: receiving, by the network side device, the pilot signal power of the macro base station reported by the macro base station, and receiving the pilot signal power of the micro base station itself reported by the micro base station. The pilot signal power of the macro base station and the pilot signal power the micro base station that are respectively reported by the macro base station and the micro base station belong to uplink pilot signal power. A process in which the macro base station and the micro base station separately measure their respective pilot signal power belongs to the prior art, and details are not described herein again.

In an optional implementation manner, a process in which the network side device determines the increment of the signal-to-interference ratio target value of the serving cell of the UE according to the difference between the pilot signal power of the macro base station and the pilot signal power of the micro base station includes: presetting, by the network side device, a first function, where the first function is a decreasing function of the difference between the pilot signal power of the macro base station and the pilot signal power of the micro base station, that is, a result of the first function decreases as the difference between the pilot signal power of the macro base station and the pilot signal power of the micro base station increases; and using, by the network side device, the difference between the pilot signal power of the macro base station and the pilot signal power of the micro base station as a parameter of the first function, and calculating the increment of the signal-to-interference ratio target value of the serving cell of the UE by using the first function. For example, the increment $\Delta = f_1(\text{P-CPICH}_{macro} - \text{P-CPICH}_{pico})$, where $\text{P-CPICH}_{macro}$ represents the pilot signal power of the macro base station, and $\text{P-CPICH}_{pico}$ represents the pilot signal power of the micro base station.

The following describes a process of how to control the UE to increase the transmit power of the HS-DPCCH by increasing the signal-to-interference ratio target value of the serving cell of the UE. The base station in the serving cell of the UE controls, according to the signal-to-interference ratio target value, the UE to adjust transmit power of a DPCCH. Specifically, the base station in the serving cell of the UE measures a signal-to-interference ratio of the DPCCH, and compares the signal-to-interference ratio obtained by measurement with the signal-to-interference ratio target value.

If the signal-to-interference ratio obtained by measurement is less than the signal-to-interference ratio target value, the base station in the serving cell of the UE sends signaling for increasing the transmit power of the DPCCH to the UE, so that the UE increases the transmit power of the DPCCH. If the signal-to-interference ratio obtained by measurement is greater than or equal to the signal-to-interference ratio target value, the base station in the serving cell of the UE sends signaling for decreasing the transmit power of the DPCCH to the UE, so that the UE decreases the transmit power of the DPCCH. As can be seen, if the signal-to-interference ratio target value used by the base station in the serving cell of the UE increases, a signal-to-interference ratio that is originally obtained by measurement and is greater than the signal-to-interference ratio target value may become less than the signal-to-interference ratio target value due to an increase of the signal-to-interference ratio target value.

In this case, the base station controls the UE to increase the transmit power of the DPCCH. Further, because the transmit power of the HS-DPCCH varies with the transmit power of the DPCCH, if the transmit power of the DPCCH increases, the transmit power of the HS-DPCCH may increase accordingly. As can be seen, by increasing the signal-to-interference ratio target value used by the base station in the serving cell of the UE, the UE may be controlled to increase the transmit power of the HS-DPCCH.

In this way, received quality of the HS-DPCCH may increase, which can further help improve HS-DPCCH demodulation quality. In addition, it can be seen from the foregoing analysis that, an increase of the transmit power of the HS-DPCCH means that the transmit power of the DPCCH also increases. Because the HS-DPCCH is demodulated based on the DPCCH, an increase of the transmit power of the DPCCH can improve received quality of the DPCCH, and the improvement of the received quality of the DPCCH helps further improve the HS-DPCCH demodulation quality.

An example is used for describing an application scenario in which the HS-DPCCH demodulation performance is affected. In the heterogeneous network, a balancing point of uplink power is different from that of downlink power, and a concept of a soft handover area exists. Whether the UE is located in a soft handover area may be determined in the following manner: In mobility measurement, when a difference between pilot signal-to-noise ratios of two cells that are measured and reported by the UE to the network side device meets a specific condition, the network side device adds, to an active set of the UE, a cell (that is, a new cell) that is not yet added to the active set of the UE. At the same time, the network side device determines, according to a largest pilot signal-to-noise ratio in the active set, which cell is the serving cell of the UE, and an RNC notifies, by using signaling, a base station in each cell and the UE of information about the active set and information about the serving cell; in this case, an area in which the UE is located is the soft handover area.

When the UE is located in a soft handover area in which the macro cell serves as the serving cell and the micro cell serves as a non-serving cell, HSDPA data is sent by the macro base station, and correspondingly, an information feedback of the HS-DPCCH is sent to the macro base station; meanwhile, when the UE is located in the soft handover area in which the macro cell serves as the serving cell and the micro cell serves as the non-serving cell, uplink power from the UE to the micro base station is higher than uplink power from the UE to the macro base station. According to a power control criterion of the soft handover area, the UE is subject to "power decreasing" control of the micro base station, and transmit power of the HS-DPCCH and transmit power of the DPCCH both decrease, which further affects HS-DPCCH demodulation performance. That is, when the UE is located in the soft handover area in which the macro cell serves as the serving cell and the micro cell serves as the non-serving cell, the HS-DPCCH demodulation performance is affected. It is noted herein that, a scenario in which the HS-DPCCH demodulation performance is affected is not limited thereto.

Using the application scenario in which the UE is located the soft handover area in which the macro cell serves as the serving cell and the micro cell serves as the non-serving cell as an example, an implementation process of step 100 includes: determining, by the network side device, that the UE is located in the soft handover area in which the macro cell serves as the serving cell and the micro cell serves as the non-serving cell; and then, determining the increment of the signal-to-interference ratio target value of the macro cell according to the difference between the pilot signal power of the macro base station and the pilot signal power of the micro base station. Based on the implementation process of step 100, step 200 includes: after increasing the signal-to-interference ratio target value of the macro cell by the increment, sending the increased signal-to-interference ratio target value to the macro base station, so that the macro base station controls the UE to increase the transmit power of the HS-DPCCH.

It can be seen from above that, according to the power adjustment method provided by this embodiment, an increment of a signal-to-interference ratio target value of a serving cell of a UE is determined according to a difference between pilot signal power of a macro base station and pilot signal power of a micro base station; and then, after the signal-to-interference ratio target value is increased by the increment, an increased signal-to-interference ratio target value is sent to a base station in the serving cell of the UE, so that the base station in the serving cell of the UE controls the UE to increase transmit power of an HS-DPCCH. In this way, received quality of the HS-DPCCH is improved, thereby improving HS-DPCCH demodulation performance. This is applicable to any scenario in which the HS-DPCCH demodulation performance needs to be improved, for example, the HS-DPCCH demodulation performance can be improved in a scenario in which the UE is located in a soft handover area in which a macro cell serves as the serving cell and a micro cell serves as a non-serving cell.

Considering that a signal-to-interference ratio target value should be set and adjusted according to decoding performance of enhanced dedicated physical data channel (E-DPDCH for short) data, the signal-to-interference ratio target value is adjusted in this embodiment of the present invention to ensure or improve the HS-DPCCH demodulation performance. To avoid an impact caused by the adjustment of the signal-to-interference ratio target value on performance of the E-DPDCH, a solution is provided by this embodiment of the present invention. A core idea of this solution is that after the signal-to-interference ratio target value is increased, gain factor (gain factor) configuration information is sent to the UE to instruct the UE to re-determine a gain factor of an E-DPDCH, so that the re-determined gain factor of the E-DPDCH to be less than a gain factor of the E-DPDCH that is determined by the UE before the UE receives the gain factor configuration information, thereby achieving a purpose of decreasing transmit power of the E-DPDCH. A decrease of the transmit power of the E-DPDCH causes degradation of the performance of the E-DPDCH, which precisely counteracts excessively good performance of the E-DPDCH caused by an increase of the signal-to-interference ratio target value, thereby reducing an impact of the increase of the signal-to-interference ratio target value on the performance of the E-DPDCH. In this way, the performance of the E-DPDCH is ensured, and problems such as relatively large interference to a network, occupation on extra load, and an impact on a network capacity are not caused by excessively high transmit power.

Further, because the base station in the serving cell of the UE needs to use the gain factor of the E-DPDCH to perform demodulation on the E-DPDCH data, the network side device also needs to send the same gain factor configuration information to the base station in the serving cell of the UE, so that the base station in the serving cell of the UE re-determines a mapping relationship between an E-DPDCH data block length and the gain factor of the E-DPDCH according to the gain factor configuration information. In this way, after receiving the E-DPDCH data and the E-DPDCH data block length that are sent by the UE, the base station in the serving cell of the UE may determine, according to the re-determined mapping relationship between the data block length and the gain factor of the E-DPDCH, the gain factor of the E-DPDCH required for demodulation, thereby completing demodulation on the E-DPDCH data.

Figure 2:
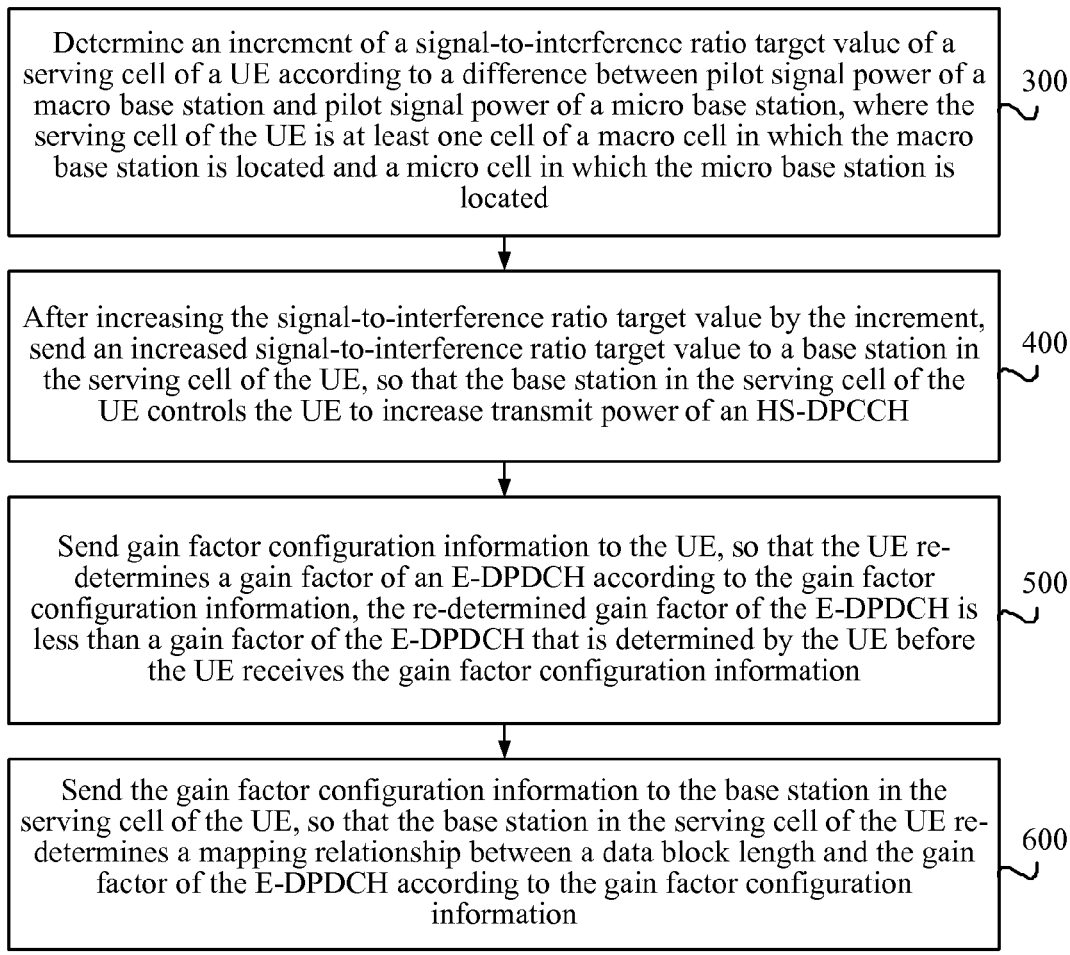
FIG. 2 is a flowchart of a power adjustment method according to another embodiment of the present invention.

Based on the foregoing description, a power adjustment method provided by another embodiment of the present invention is shown in FIG. 2, and includes the following steps.

Step 300: Determine an increment of a signal-to-interference ratio target value (SIRtarget) of a serving cell of a UE according to a difference between pilot signal power of a macro base station and pilot signal power of a micro base station, where the serving cell of the UE is at least one of a macro cell in which the macro base station is located and a micro cell in which the micro base station is located.

Step 400: After increasing the signal-to-interference ratio target value by the increment, send an increased signal-to-interference ratio target value to a base station in the serving cell of the UE, so that the base station in the serving cell of the UE controls the UE to increase transmit power of an HS-DPCCH.

Step 500: Send gain factor configuration information to the UE, so that the UE re-determines a gain factor of an E-DPDCH according to the gain factor configuration information, where the re-determined gain factor of the E-DPDCH is less than a gain factor of the E-DPDCH that is determined by the UE before the UE receives the gain factor configuration information.

Step 600: Send the gain factor configuration information to the base station in the serving cell of the UE, so that the base station in the serving cell of the UE re-determines a mapping relationship between a data block length and the gain factor of the E-DPDCH according to the gain factor configuration information.

It is noted herein that, step 500 may be performed after step 400, and may also be performed with step 400 at the same time. Step 600 may be performed after step 400, and may also be performed with step 400 at the same time.

In this embodiment, after increasing the signal-to-interference ratio target value of the serving cell of the UE by the determined increment, a network side device sends the gain factor configuration information separately to the UE and the base station in the serving cell of the UE to overcome an impact of an increase of the signal-to-interference ratio target value on the E-DPDCH. For the UE, the gain factor configuration information is used to instruct the UE to re-determine the gain factor of the E-DPDCH and ensure that the re-determined gain factor of the E-DPDCH is less than a gain factor used before the re-determining, where a decrease of the gain factor of the E-DPDCH means a decrease of the transmit power of the E-DPDCH.

A preferred implementation manner of sending, by a network side device, the gain factor configuration information to the base station in the serving cell of the UE is as follows: After increasing the signal-to-interference ratio target value of the serving cell of the UE by the determined increment, the network side device sends, to the base station in the serving cell of the UE, a same message that carries both the increased signal-to-interference ratio target value and the gain factor configuration information. Based on this, the base station in the serving cell of the UE, on one hand, controls the UE to increase the transmit power of the HS-DPCCH according to the increased signal-to-interference ratio target value, and on the other hand, re-determines the mapping relationship between the data block length and the gain factor of the E-DPDCH.

It is noted herein that, in a scenario in which the UE is located in a soft handover area in which the macro cell serves as the serving cell and the micro cell serves as a non-serving cell, the network side device sends the gain factor configuration information separately to the UE and the macro base station. A purpose of sending the gain factor configuration information to the UE is to instruct the UE to re-determine and decrease the gain factor of the E-DPDCH; and a purpose of sending the gain factor configuration information to the macro base station is to instruct the base station to re-determine the mapping relationship between the data block length and the gain factor of the E-DPDCH, so as to perform demodulation on E-DPDCH data.

In this embodiment, the gain factor configuration information may be any information that can instruct the UE to re-determine the gain factor of the E-DPDCH and decrease the re-determined gain factor of the E-DPDCH. An example is used for description below.

In an optional implementation manner, the gain factor configuration information sent by the network side device may be a first reference gain factor, and the first reference gain factor is less than a second reference gain factor used by the UE before the UE receives the gain factor configuration information (that is, the first reference gain factor). A reference gain factor is a parameter used by the UE for determining the gain factor of the E-DPDCH, and a greater reference gain factor indicates a greater determined gain factor of the E-DPDCH. As can be seen, after the UE receives the first reference gain factor sent by the network side device, the gain factor of the E-DPDCH that is re-determined according to the first reference gain factor may be less than a gain factor used before the re-determining, that is, the gain factor of the E-DPDCH is decreased.

In an optional implementation manner, the gain factor configuration information sent by the network side device may include a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information. Based on this, after the UE receives the first primary reference gain factor and the first secondary reference gain factor that are sent by the network side device, the gain factor of the E-DPDCH that is re-determined according to the first primary reference gain factor and the first secondary reference gain factor may be less than the gain factor used before the re-determining, that is, the gain factor of the E-DPDCH is decreased.

In an optional implementation manner, the gain factor configuration information sent by the network side device may be a second function, and the second function is used to decrease the gain factor of the E-DPDCH that is determined by the UE before the UE receives the gain factor configuration information. In this implementation manner, the network side device sends a function to the UE, where the function is denoted as the second function for ease of differentiation. The UE may multiply the second function by the gain factor of the E-DP-DCH that is determined by the UE before the UE receives the gain factor configuration information, so as to re-determine the gain factor of the E-DPDCH; it can be ensured that the re-determined gain factor of the E-DPDCH is less than the gain factor used before the re-determining. This embodiment constitutes no limitation on specific implementation of the second function, for example, the second function may be a function related to an interference level, for example, a result of the second function may decrease as the interference level increases.

Optionally, the second function may be a constant greater than 0 and less than 1, and the constant is denoted as a first weight coefficient. Then, the UE may directly multiply the first weight coefficient by the gain factor of the E-DPDCH that is determined by the UE before the UE receives the gain factor configuration information, so as to re-determine the gain factor of the E-DPDCH. Because a value of the first weight coefficient is greater than 0 and less than 1, the re-determined gain factor of the E-DPDCH is less than the gain factor used before the re-determining, that is, the gain factor of the E-DPDCH is decreased.

In an optional implementation manner, the gain factor configuration information sent by the network side device may be a third function, and the third function is used to decrease a second reference gain factor used for determining, by the UE, the gain factor of the E-DPDCH before the UE receives the gain factor configuration information, where the second reference gain factor is a parameter of the third function. In this implementation manner, the third function is a function of the second reference gain factor and is used for decreasing the second reference gain factor. Therefore, the gain factor of the E-DPDCH that is re-determined by the UE by using the second reference gain factor decreased by using the third function is less than the gain factor used before the re-determining.

Optionally, the third function may be a constant greater than 0 and less than 1, and the constant is denoted as a second weight coefficient. In this implementation manner, the UE may multiply the second reference gain factor by the constant, and then, re-determine the gain factor of the E-DPDCH by using a result of the multiplication. Because a value of the constant is greater than 0 and less than 1, the result of the multiplication of the second reference gain factor by the constant is less than the original second reference gain factor, which means that the second reference gain factor is decreased. Therefore, the gain factor of the E-DPDCH that is re-determined according to the result of the multiplication of the second reference gain factor by the constant is less than the gain factor used before the re-determining.

In this embodiment, a network side device, on one hand, increases a signal-to-interference ratio target value of a serving cell of a UE, so that a base station in the serving cell of the UE controls the UE to increase transmit power of an HS-DPCCH, thereby improving received quality of the HS-DPCCH, and ensuring or improving HS-DPCCH demodulation performance; and on the other hand, sends gain factor configuration information to the UE and the base station in the serving cell of the UE, thereby reducing an impact of an increase of the signal-to-interference ratio target value on an E-DPDCH, and reducing interference to a network and an impact on a network capacity.

Figure 3:
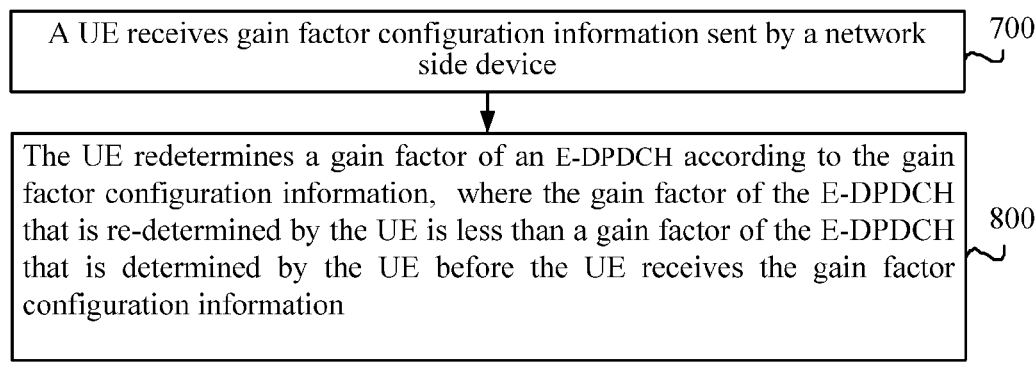
FIG. 3 is a flowchart of a power adjustment method according to still another embodiment of the present invention.

FIG. 3 is a flowchart of a power adjustment method according to still another embodiment of the present invention. As shown in FIG. 3, the method in this embodiment includes the following steps.

Step 700: A UE receives gain factor configuration information sent by a network side device.

Step 800: The UE re-determines a gain factor of an E-DPDCH according to the gain factor configuration information, where the gain factor of the E-DPDCH that is re-determined by the UE is less than a gain factor of the E-DPDCH that is determined by the UE before the UE receives the gain factor configuration information.

In this embodiment, the UE receives the gain factor configuration information sent by the network side device, re-determines the gain factor of the E-DPDCH according to the gain factor configuration information, so that the re-determined gain factor of the E-DPDCH to be decreased. A decrease of the gain factor of the E-DPDCH means a decrease of transmit power of the E-DPDCH, so that performance of the E-DPDCH can be degraded, and a case in which performance of the E-DPDCH becomes excessively good does not occur, thereby solving problems such as interference to a network and an impact on a network capacity that are caused by excessively good performance of the E-DPDCH.

The method in this embodiment is applicable to various scenarios in which E-DPDCH performance needs to be degraded. One of the scenarios in which the performance of the E-DPDCH needs to be degraded is as follows: To ensure HS-DPCCH demodulation performance, the network side device increases a signal-to-interference ratio target value of a serving cell of the UE, and sends an increased signal-to-interference ratio target value to a base station in the serving cell of the UE. Further, the application scenario is as follows: The UE is located in a soft handover area in which a macro cell serves as the serving cell and a micro cell serves as a non-serving cell; to ensure the HS-DPCCH demodulation performance, the network side device increases a signal-to-interference ratio target value of the macro cell, and sends an increased signal-to-interference ratio target value to the macro base station. That is, the gain factor configuration information is sent by the network side device to the UE after the network side device increases the signal-to-interference ratio target value of the serving cell of the UE, and sends the increased signal-to-interference ratio target value to the base station in the serving cell of the UE.

A process in which the UE re-determines the gain factor of the E-DPDCH according to the gain factor configuration information may vary with the gain factor configuration information sent by the network side device. An example is used for description below:

In an optional implementation manner, the gain factor configuration information is a first reference gain factor, and the first reference gain factor is less than a second reference gain factor used by the UE before the UE receives the gain factor configuration information; or the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information. Based on this, an implementation manner of step 800 includes: re-determining, by the UE, the gain factor of the E-DPDCH according to a formula (1) or a formula (2):

$$\beta_{ed,i,harq} = \beta'_{ed,ref} \sqrt{\frac{L'_{e,ref}}{L_{e,i}}} \sqrt{\frac{K_{e,i}}{K'_{e,ref}}} \cdot 10^{\left(\frac{\Delta harq}{20}\right)}; \text{ or} \quad (1)$$

$$\beta_{ed,i,harq} = \sqrt{\frac{L'_{e,ref,1}}{L_{e,i}}} \cdot \sqrt{\left(\left(\frac{\frac{L'_{e,ref,2}}{L'_{e,ref,1}}\beta'^2_{ed,ref,2} - \beta'^2_{ed,ref,1}}{K'_{e,ref,2} - K'_{e,ref,1}}\right)(K_{e,i} - K'_{e,ref,1}) + \beta'^2_{ed,ref,1}\right)} \cdot 10^{\left(\frac{\Delta harq}{20}\right)} \quad (2)$$

In the foregoing formulas (1) and (2), $\beta_{ed,i,harq}$ is the re-determined gain factor of the E-DPDCH, and $\Delta harq$ is a HARQ offset of the E-DPDCH. In the formula (1), $\beta'_{ed,ref}$ is the first reference gain factor; $L'_{e,ref}$ is a quantity of first reference code channels; $L_{e,i}$ is a quantity of code channels of an E-DPDCH data block of the re-determined gain factor; $K_{e,i}$ is a block length of the E-DPDCH data block of the re-determined gain factor; and $K'_{e,ref}$ is a first reference data block length. In the formula (2), $L'_{e,ref,1}$ is a quantity of first primary reference code channels; $L'_{e,ref,2}$ is a quantity of first secondary reference code channels; $\beta'_{ed,ref,1}$ is the first primary reference gain factor; $\beta'_{ed,ref,2}$ is the first secondary reference gain factor; $K'_{e,ref,1}$ is a first primary reference block length; and $K'_{e,ref,2}$ is a first secondary reference block length.

The foregoing formula (1) is an extrapolation formula used for calculating the gain factor of the E-DPDCH; and the formula (2) is an interpolation formula used for calculating the gain factor of the E-DPDCH. Whether the UE uses the extrapolation formula or the interpolation formula may be preconfigured by a network side.

In an optional implementation manner, the gain factor configuration information is a second function, and the second function is used to decrease the gain factor of the E-DPDCH that is determined by the UE before the UE receives the gain factor configuration information. For example, the second function may be a function related to an interference level, for example, may decrease as the interference level increases. Based on this, an implementation manner of step 800 includes: multiplying, by the UE, the second function by the gain factor of the E-DPDCH channel that is determined by the UE before the UE receives the gain factor configuration information, so as to re-determine the gain factor of the E-DPDCH channel. For example, the UE may re-determine the gain factor of the E-DPDCH channel by using a formula $\beta_{ed,i,harq} = f_2 \cdot \beta^0_{ed,i,harq}$.

Optionally, the second function may be a constant greater than 0 and less than 1, and the constant is denoted as a first weight coefficient. Based on this, an implementation manner of step 800 includes: re-determining, by the UE, the gain factor of the E-DPDCH according to a formula (3):

$$\beta_{ed,i,harq} = K_1 \cdot \beta^0_{ed,i,harq} \quad (3)$$

In the foregoing formula (3), $\beta_{ed,i,harq}$ is the re-determined gain factor of the E-DPDCH; $K_1$ is the first weight coefficient; and $\beta^0_{ed,i,harq}$ is the gain factor of the E-DPDCH that is determined by the UE before the UE receives the gain factor configuration information. Before receiving the gain factor configuration information, the UE may also determine the gain factor of the E-DPDCH by using an interpolation formula or an extrapolation formula, where the extrapolation formula and the interpolation formula are respectively shown by the formula (1) and the formula (2); however, the first reference gain factor in the formula (1) and the formula (2)

needs to be replaced by the second reference gain factor used by the UE before the UE receives the gain factor configuration information.

In an optional implementation manner, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function. Based on this, an implementation manner of step 800 includes: using, by the UE, the second reference gain factor as a parameter, and calculating a third reference gain factor by using the third function. For example, the UE may re-determine the gain factor of the E-DPDCH channel by using a formula $\beta_{ed,ref,3} = f_3(\beta_{ed,ref})$, where $\beta_{ed,ref,3}$ is the third reference gain factor; and then, re-determines the gain factor of the E-DPDCH by using the third reference gain factor. The UE may also determine the gain factor of the E-DPDCH by using an interpolation formula or an extrapolation formula based on the third reference gain factor, where the extrapolation formula and the interpolation formula are respectively shown by the formula (1) and the formula (2); however, the first reference gain factor in the formula (1) and the formula (2) needs to be replaced by the third reference gain factor herein.

Optionally, the third function may be a constant greater than 0 and less than 1, and the constant may be used as a weight coefficient of the second reference gain factor used by the UE before the UE receives the gain factor configuration information, and is referred to as a second weight coefficient. Based on this, an implementation manner of step 800 includes: re-determining, by the UE, the gain factor of the E-DPDCH according to a formula (4) or (5):

$$\beta_{ed,i,harq} = K_2 * \beta_{ed,ref} \sqrt{\frac{L_{e,ref}}{L_{e,i}}} \sqrt{\frac{K_{e,i}}{K_{e,ref}}} \cdot 10^{\left(\frac{\Delta harq}{20}\right)}; \text{ or} \quad (4)$$

$$\beta_{ed,i,harq} = K_2 * \sqrt{\frac{L_{e,ref,1}}{L_{e,i}}} \cdot \\ \sqrt{\left(\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)} \cdot \\ 10^{\left(\frac{\Delta harq}{20}\right)} \quad (5)$$

In the foregoing formulas (4) and (5), $\beta_{ed,i,harq}$ is the re-determined gain factor of the E-DPDCH; $K_2$ is the second weight coefficient; for other parameters, refer to explanations of the formula (1) and the formula (2), where a difference only lies in that these parameters are used by the UE before the UE re-determines the gain factor of the E-DPDCH.

In this embodiment, a UE receives gain factor configuration information sent by a network side device, re-determines a gain factor of an E-DPDCH according to the gain factor configuration information, so that the re-determined gain factor of the E-DPDCH to be decreased, which can degrade performance of the E-DPDCH, so that a case in which the performance of the E-DPDCH becomes excessively good does not occur, thereby reducing problems such as interference to a network and an impact on a network capacity that are caused by excessively good performance of the E-DPDCH. This is applicable to various scenarios in which the performance of the E-DPDCH needs to be degraded.

Figure 4:
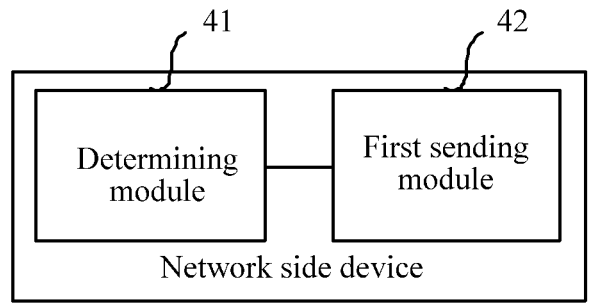
FIG. 4 is a schematic structural diagram of a network side device according to an embodiment of the present invention.

FIG. 4 is a schematic structural diagram of a network side device according to an embodiment of the present invention. As shown in FIG. 4, the network side device in this embodiment includes: a determining module 41 and a first sending module 42.

The determining module 41 is configured to determine an increment of a signal-to-interference ratio target value of a serving cell of a UE according to a difference between pilot signal power of a macro base station and pilot signal power of a micro base station, where the serving cell of the UE is at least one of a macro cell in which the macro base station is located and a micro cell in which the micro base station is located.

The first sending module 42 is configured to: after the signal-to-interference ratio target value is increased by the increment, send an increased signal-to-interference ratio target value to a base station in the serving cell of the UE, so that the base station in the serving cell of the UE controls the UE to increase transmit power of an HS-DPCCH.

Figure 5:
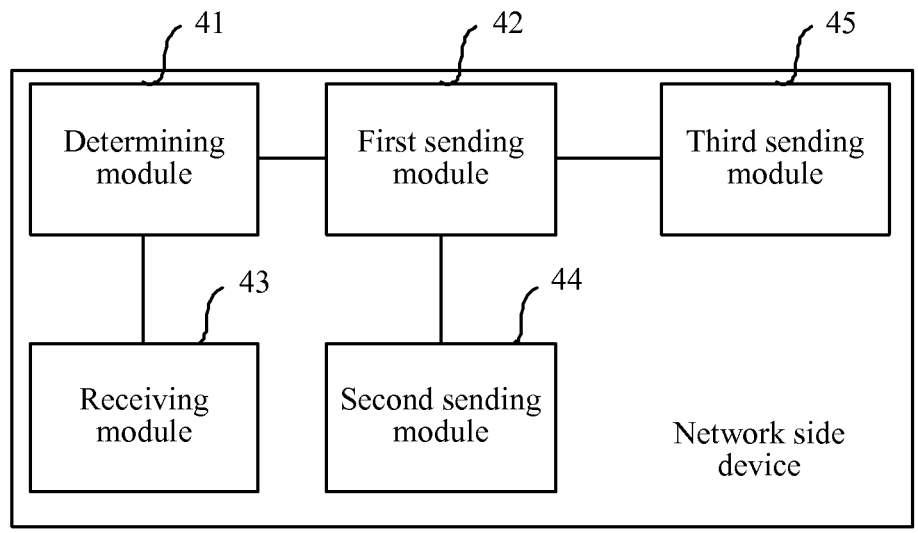
FIG. 5 is a schematic structural diagram of a network side device according to another embodiment of the present invention.

In an optional implementation manner, as shown in FIG. 5, the network side device in this embodiment further includes a receiving module 43. The receiving module 43 is configured to: before the determining module determines the increment, receive the pilot signal power of the macro base station and the pilot signal power of the micro base station that are reported by the UE; or configured to receive the pilot signal power of the macro base station that is reported by the macro base station, and receive the pilot signal power of the micro base station that is reported by the micro base station. The receiving module 43 is connected to the determining module 41 and is configured to provide the pilot signal power of the macro base station and the pilot signal power of the micro base station to the determining module 41.

In an optional implementation manner, the determining module 41 may be specifically configured to use the difference between the pilot signal power of the macro base station and the pilot signal power of the micro base station as a parameter of a preset first function, and calculate the increment of the signal-to-interference ratio target value of the serving cell of the UE by using the first function, where the first function is a decreasing function of the difference between the pilot signal power of the macro base station and the pilot signal power of the micro base station.

In an optional implementation manner, the determining module 41 may be specifically configured to determine that the UE is located in a soft handover area in which the macro cell serves as the serving cell and the micro cell serves as a non-serving cell, and determine the increment of the signal-to-interference ratio target value of the macro cell according to the difference between the pilot signal power of the macro base station and the pilot signal power of the micro base station.

In an optional implementation manner, as shown in FIG. 5, the network side device in this embodiment further includes a second sending module 44. The second sending module 44 is configured to: after the signal-to-interference ratio target value is increased by the increment, send gain factor configuration information to the UE, so that the UE re-determines a gain factor of an E-DPDCH according to the gain factor configuration information, where the re-determined gain factor of the E-DPDCH is less than a gain factor of the E-DPDCH that is determined by the UE before the UE receives the gain factor configuration information.

In an optional implementation manner, as shown in FIG. 5, the network side device in this embodiment further includes a third sending module 45. The third sending module 45 is configured to send the gain factor configuration information to the base station in the serving cell of the UE, so that the base station in the serving cell of the UE re-determines a mapping relationship between a data block length and the gain factor of the E-DPDCH according to the gain factor configuration information.

Optionally, in specific implementation, the third sending module 45, the second sending module 44, and the first sending module 42 may be implemented by a same sending module.

The gain factor configuration information in this embodiment may have different implementation manners, and an example is used for description below.

The gain factor configuration information is a first reference gain factor, and the first reference gain factor is less than a second reference gain factor used by the UE before the UE receives the gain factor configuration information. In another embodiment, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information. In another embodiment, the gain factor configuration information is a second function, and the second function is used to decrease the gain factor of the E-DPDCH that is determined by the UE before the UE receives the gain factor configuration information. In another embodiment, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function.

The network side device provided by this embodiment may be an RNC, but is not limited thereto, for example, may also be a base station.

Various functional modules of the network side device provided by this embodiment may be configured to implement corresponding processes in the foregoing method shown in FIG. 1 or FIG. 2. A specific working principle thereof is not described in detail again. For details, refer to the description of the method embodiments.

The network side device provided by this embodiment of the present invention determines an increment of a signal-to-interference ratio target value of a serving cell of a UE according to a difference between pilot signal power of a macro base station and pilot signal power of a micro base station; and then, after the signal-to-interference ratio target value is increased by the increment, sends an increased signal-to-interference ratio target value to a base station in the serving cell of the UE, so that the base station in the serving cell of the UE controls the UE to increase transmit power of an HS-DPCCH. In this way, received quality of the HS-DPCCH is improved, thereby improving HS-DPCCH demodulation performance. This is particularly applicable to improvement of the HS-DPCCH demodulation performance when the UE is located in a soft handover area.

Figure 6A:
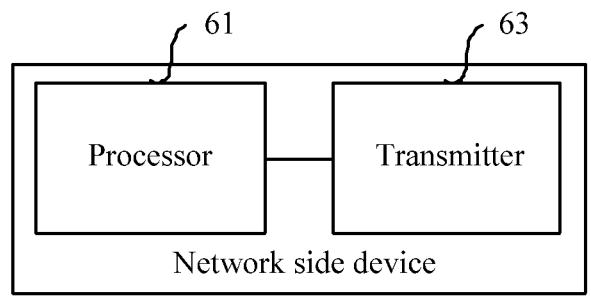
FIG. 6A is a schematic structural diagram of a network side device according to still another embodiment of the present invention.

FIG. 6A is a schematic structural diagram of a network side device according to still another embodiment of the present invention. As shown in FIG. 6A, the network side device in this embodiment includes: a processor 61, and a transmitter 63.

The processor 61 is configured to determine an increment of a signal-to-interference ratio target value of a serving cell of a UE according to a difference between pilot signal power of a macro base station and pilot signal power of a micro base station, and increase the signal-to-interference ratio target value by the increment, where the serving cell of the UE is at least one of a macro cell in which the macro base station is located and a micro cell in which the micro base station is located.

The processor 61 may be a central processing unit (Central Processing Unit, CPU for short), or an application-specific integrated circuit (Application Specific Integrated Circuit, ASIC for short), or one or more integrated circuits configured to implement this embodiment of the present invention.

The transmitter 63 is configured to send a signal-to-interference ratio target value increased by the processor 61 by the increment to a base station in the serving cell of the UE, so that the base station in the serving cell of the UE controls the UE to increase transmit power of an HS-DPCCH.

Figure 6B:
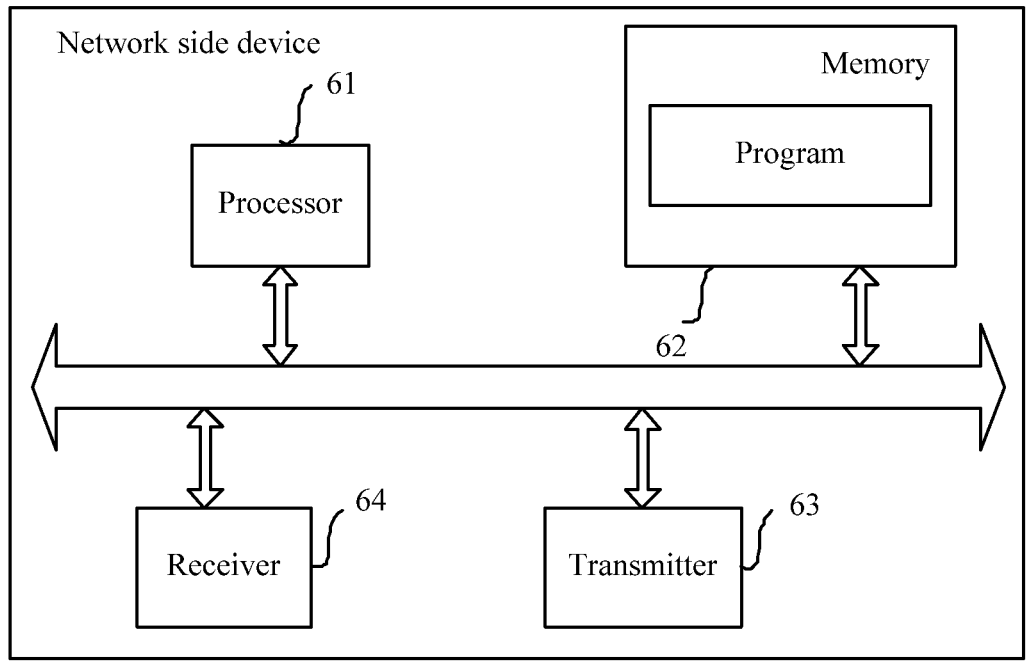
FIG. 6B is a schematic structural diagram of a network side device according to yet another embodiment of the present invention.

In an optional implementation manner, as shown in FIG. 6B, the network side device in this embodiment further includes a receiver 64. The receiver 64 is configured to: before the processor 61 determines the increment, receive the pilot signal power of the macro base station and the pilot signal power of the micro base station that are reported by the UE; or configured to: before the processor 61 determines the increment, receive the pilot signal power of the macro base station that is reported by the macro base station, and receive the pilot signal power of the micro base station that is reported by the micro base station.

In an optional implementation manner, the processor 61 may be specifically configured to use the difference between the pilot signal power of the macro base station and the pilot signal power of the micro base station as a parameter of a preset first function, and calculate the increment of the signal-to-interference ratio target value of the serving cell of the UE by using the first function, where the first function is a decreasing function of the difference between the pilot signal power of the macro base station and the pilot signal power of the micro base station.

In an optional implementation manner, the processor 61 may be specifically configured to determine that the UE is located in a soft handover area in which the macro cell serves as the serving cell and the micro cell serves as a non-serving cell, and determine the increment of the signal-to-interference ratio target value of the macro cell according to the difference between the pilot signal power of the macro base station and the pilot signal power of the micro base station.

In an optional implementation manner, the transmitter 63 is further configured to: after the processor 61 increases the signal-to-interference ratio target value by the increment, send gain factor configuration information to the UE, so that the UE re-determines a gain factor of an E-DPDCH according to the gain factor configuration information, where the re-determined gain factor of the E-DPDCH is less than a gain factor of the E-DPDCH that is determined by the UE before the UE receives the gain factor configuration information.

In an optional implementation manner, the transmitter 63 is further configured to send the gain factor configuration information to the base station in the serving cell of the UE, so that the base station in the serving cell of the UE re-determines a mapping relationship between a data block length and the gain factor of the E-DPDCH according to the gain factor configuration information.

Optionally, the gain factor configuration information is a first reference gain factor, and the first reference gain factor is less than a second reference gain factor used by the UE before the UE receives the gain factor configuration information. In another embodiment, the gain factor configuration information includes a first primary reference gain factor and a first secondary reference gain factor, where the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information. In another embodiment, the gain factor configuration information is a second function, and the second function is used to decrease the gain factor of the E-DPDCH that is determined by the UE before the UE receives the gain factor configuration information. In another embodiment, the gain factor configuration information is a third function, and the third function is used to decrease a second reference gain factor used for determining, by the UE, the gain factor of the E-DPDCH before the UE receives the gain factor configuration information, where the second reference gain factor is a parameter of the third function.

In an optional implementation manner, as shown in FIG. 6B, the network side device in this embodiment further includes a memory 62. The memory 62 is configured to store a program. Specifically, the program may include program code, where the program code includes a computer operation instruction. The memory 62 may include a high-speed RAM memory, and may further include a non-volatile memory (non-volatile memory), for example, at least one disk memory.

Optionally, when the processor 61, and the memory 62, the transmitter 63, and the receiver 64 are implemented independently, the processor 61, and the memory 62, the transmitter 63, and the receiver 64 may be connected to each other and complete mutual communication by using a bus. The bus may be an industry standard architecture (Industry Standard Architecture, ISA for short) bus, a peripheral component interconnect (Peripheral Component Interconnect, PCI for short) bus, an extended industry standard architecture (Extended Industry Standard Architecture, EISA for short) bus, or the like. The bus may be classified into an address bus, a data bus, a control bus, and the like. For ease of denotation, the bus is represented by using only one bold line in FIG. 6B; however, it does not indicate that there is only one bus or only one type of bus.

Optionally, when the processor 61, and the memory 62, the transmitter 63, and the receiver 64 are integrated into one chip for implementation, the processor 61, and the memory 62, the transmitter 63, and the receiver 64 may complete mutual communication through an internal interface.

The network side device provided by this embodiment may be an RNC, but is not limited thereto, for example, may also be a base station.

The network side device provided by this embodiment may be configured to implement corresponding processes in the foregoing method shown in FIG. 1 or FIG. 2. A specific working principle thereof is not described in detail again. For details, refer to the description of the method embodiments.

The network side device provided by this embodiment of the present invention determines an increment of a signal-to-interference ratio target value of a serving cell of a UE according to a difference between pilot signal power of a macro base station and pilot signal power of a micro base station; and then, after the signal-to-interference ratio target value is increased by the increment, sends an increased signal-to-interference ratio target value to a base station in the serving cell of the UE, so that the base station in the serving cell of the UE controls the UE to increase transmit power of an HS-DPCCH. In this way, received quality of the HS-DPCCH is improved, thereby improving HS-DPCCH demodulation performance. This is particularly applicable to improvement of the HS-DPCCH demodulation performance when the UE is located in a soft handover area.

Figure 7:
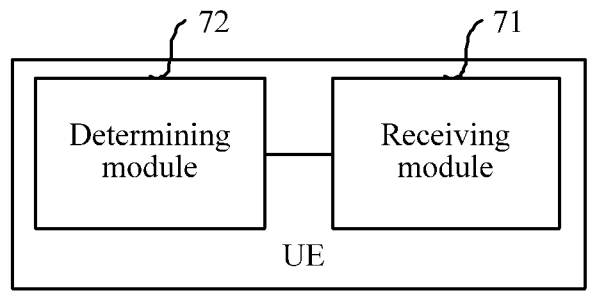
FIG. 7 is a schematic structural diagram of a UE according to an embodiment of the present invention.

FIG. 7 is a schematic structural diagram of a UE according to an embodiment of the present invention. As shown in FIG. 7, the UE in this embodiment includes: a receiving module 71 and a determining module 72.

The receiving module 71 is configured to receive gain factor configuration information sent by a network side device.

The determining module 72 is connected to the receiving module 71 and is configured to re-determine a gain factor of an E-DPDCH according to the gain factor configuration information received by the receiving module 71, where the gain factor of the E-DPDCH that is re-determined by the UE in this embodiment is less than a gain factor of the E-DPDCH that is determined by the UE in this embodiment before the UE receives the gain factor configuration information.

In an optional implementation manner, the gain factor configuration information received by the receiving module 71 is a first reference gain factor, and the first reference gain factor is less than a second reference gain factor used by the UE in this embodiment before the UE receives the gain factor configuration information. Based on this, the determining module 72 may be specifically configured to re-determine the gain factor of the E-DPDCH according to a formula (1). For description of the formula (1), refer to the foregoing method embodiments, and details are not described herein again.

In an optional implementation manner, the gain factor configuration information received by the receiving module 71 includes a first primary reference gain factor and a first secondary reference gain factor, where the first primary reference gain factor is less than a second primary reference gain factor used by the UE in this embodiment before the UE receives the gain factor configuration information, and the first secondary reference gain factor is less than a second secondary reference gain factor used by the UE in this embodiment before the UE receives the gain factor configuration information. Based on this, the determining module 72 may be specifically configured to re-determine the gain factor of the E-DPDCH according to a formula (2). For description of the formula (2), refer to the foregoing method embodiments, and details are not described herein again.

In an optional implementation manner, the gain factor configuration information received by the receiving module 71 is a second function, and the second function is used to decrease the gain factor of the E-DPDCH that is determined by the UE in this embodiment before the UE receives the gain factor configuration information. Based on this, the determining module 72 may be specifically configured to multiply the second function by the gain factor of the E-DPDCH channel that is determined by the UE in this embodiment before the UE receives the gain factor configuration information, so as to re-determine the gain factor of the E-DPDCH channel.

Optionally, the second function may be a constant greater than 0 and less than 1, and the constant may be regarded as a weight coefficient of the gain factor of the E-DPDCH that is determined by the UE in this embodiment before the UE receives the gain factor configuration information, and is referred to as a first weight coefficient. Based on this, the determining module 72 may be specifically configured to re-determine the gain factor of the E-DPDCH according to a formula (3). For description of the formula (3), refer to the foregoing method embodiments, and details are not described herein again.

In an optional implementation manner, the gain factor configuration information received by the receiving module 71 is a third function, and the third function is used to decrease a second reference gain factor used for determining, by the UE in this embodiment before the UE receives the gain factor configuration information, the gain factor of the E-DPDCH, where the second reference gain factor is a parameter of the third function. Based on this, the determining module 72 may be specifically configured to use the second reference gain factor as a parameter, calculate a third reference gain factor by using the third function, and then re-determine the gain factor of the E-DPDCH by using the third reference gain factor.

Optionally, the third function may be a constant greater than 0 and less than 1, and the constant may be regarded as a weight coefficient of the second reference gain factor, and is referred to as a second weight coefficient. Based on this, the determining module 72 may be specifically configured to re-determine the gain factor of the E-DPDCH according to a formula (4) or a formula (5). For description of the formula (4) or the formula (5), refer to the foregoing method embodiments, and details are not described herein again.

Various functional modules of the UE provided by this embodiment may be configured to implement corresponding processes in the method embodiment shown in FIG. 3. A specific working principle thereof is not described in detail again. For details, refer to the description of the method embodiments.

The UE provided by this embodiment receives gain factor configuration information sent by a network side device, re-determines a gain factor of an E-DPDCH according to the gain factor configuration information, so that the re-determined gain factor of the E-DPDCH to be decreased, which can degrade performance of the E-DPDCH, so that a case in which the performance of the E-DPDCH becomes excessively good does not occur, thereby reducing problems such as interference to a network and an impact on a network capacity that are caused by excessively good performance of the E-DPDCH. This is applicable to various scenarios in which the performance of the E-DPDCH needs to be degraded.

Figure 8A:
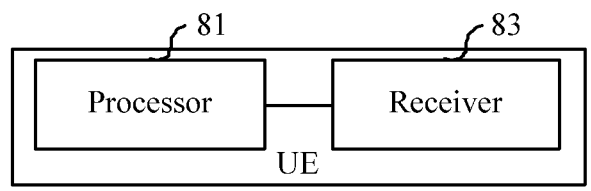
FIG. 8A is a schematic structural diagram of a UE according to another embodiment of the present invention.

FIG. 8A is a schematic structural diagram of a UE according to another embodiment of the present invention. As shown in FIG. 8A, the UE in this embodiment includes a processor 81 and a receiver 83.

The receiver 83 is configured to receive gain factor configuration information sent by a network side device.

The processor 81 is configured to re-determine a gain factor of an E-DPDCH according to the gain factor configuration information received by the receiver 83, where the gain factor of the E-DPDCH that is re-determined by the UE (specifically, the processor 81 in the UE) in this embodiment is less than a gain factor of the E-DPDCH that is determined by the UE in this embodiment before the UE receives the gain factor configuration information.

The processor 81 may be a CPU, or an ASIC, or one or more integrated circuits that are configured to implement this embodiment of the present invention.

In an optional implementation manner, the gain factor configuration information received by the receiver 83 is a first reference gain factor, and the first reference gain factor is less than a second reference gain factor used by the UE in this embodiment before the UE receives the gain factor configuration information. Based on this, the processor 81 may be specifically configured to re-determine the gain factor of the E-DPDCH according to a formula (1). For description of the formula (1), refer to the foregoing method embodiments, and details are not described herein again.

In an optional implementation manner, the gain factor configuration information received by the receiver 83 includes a first primary reference gain factor and a first secondary reference gain factor, where the first primary reference gain factor is less than a second primary reference gain factor used by the UE in this embodiment before the UE receives the gain factor configuration information, and the first secondary reference gain factor is less than a second secondary reference gain factor used by the UE in this embodiment before the UE receives the gain factor configuration information. Based on this, the processor 81 may be specifically configured to re-determine the gain factor of the E-DPDCH according to a formula (2). For description of the formula (2), refer to the foregoing method embodiments, and details are not described herein again.

In an optional implementation manner, the gain factor configuration information received by the receiver 83 is a second function, and the second function is used to decrease the gain factor of the E-DPDCH that is determined by the UE in this embodiment before the UE receives the gain factor configuration information. Based on this, the processor 81 may be specifically configured to multiply the second function by the gain factor of the E-DPDCH channel that is determined by the UE in this embodiment before the UE receives the gain factor configuration information, so as to re-determine the gain factor of the E-DPDCH channel.

Optionally, the second function may be a constant greater than 0 and less than 1, and the constant may be regarded as a weight coefficient of the gain factor of the E-DPDCH that is determined by the UE in this embodiment before the UE receives the gain factor configuration information, and is referred to as a first weight coefficient. Based on this, the processor 81 may be specifically configured to re-determine the gain factor of the E-DPDCH according to a formula (3). For description of the formula (3), refer to the foregoing method embodiments, and details are not described herein again.

In an optional implementation manner, the gain factor configuration information received by the receiver 83 is a third function, and the third function is used to decrease a second reference gain factor used for determining, by the UE in this embodiment before the UE receives the gain factor configuration information, the gain factor of the E-DPDCH, where the second reference gain factor is a parameter of the third function. Based on this, the processor 81 may be specifically configured to use the second reference gain factor as a parameter, calculate a third reference gain factor by using the third function, and then re-determine the gain factor of the E-DPDCH by using the third reference gain factor.

Optionally, the third function may be a constant greater than 0 and less than 1, and the constant may be regarded as a weight coefficient of the second reference gain factor, and is referred to as a second weight coefficient. Based on this, the processor 81 may be specifically configured to re-determine the gain factor of the E-DPDCH according to a formula (4) or a formula (5). For description of the formula (4) or the formula (5), refer to the foregoing method embodiments, and details are not described herein again.

Figure 8B:
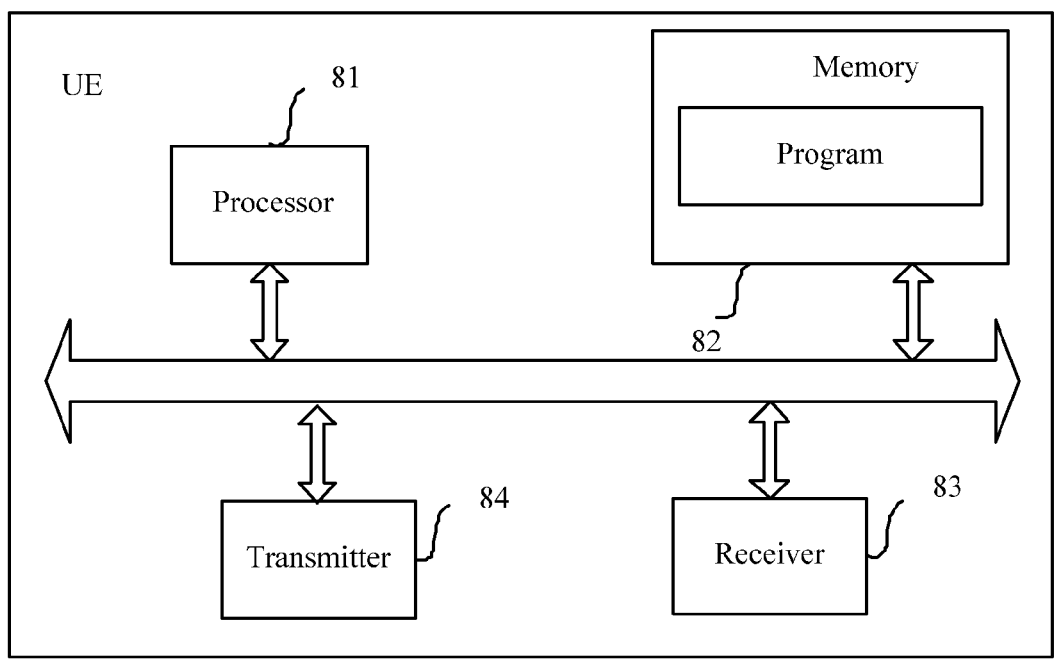
FIG. 8B is a schematic structural diagram of a UE according to still another embodiment of the present invention.

In an optional implementation manner, as shown in FIG. 8B, the UE in this embodiment may further include: a memory 82 and a transmitter 84. The memory 82 is configured to store a program. Specifically, the program may include program code, where the program code includes a computer operation instruction. The memory 82 may include a high-speed RAM memory, and may further include a non-volatile memory (non-volatile memory), for example, at least one disk memory. The transmitter 84 is mainly configured to send data to the network side device or another device.

Optionally, when the processor 81, and the memory 82, the receiver 83, and the transmitter 84 are implemented independently, the processor 81, the memory 82, the receiver 83, and the transmitter 84 may be connected to each other and complete mutual communication by using a bus. The bus may be an ISA bus, a PCI bus, an EISA bus, or the like. The bus may be classified into an address bus, a data bus, a control bus, and the like. For ease of denotation, the bus is represented by using only one bold line in FIG. 8B; however, it does not indicate that there is only one bus or only one type of bus.

Optionally, when the processor 81, the memory 82, the receiver 83, and the transmitter 84 are integrated into one chip for implementation, the processor 81, the memory 82, the receiver 83, and the transmitter 84 may complete mutual communication through an internal interface.

The UE provided by this embodiment may be configured to implement corresponding processes in the method embodiment shown in FIG. 3. A specific working principle thereof is not described in detail again. For details, refer to the description of the method embodiments.

The UE provided by this embodiment receives gain factor configuration information sent by a network side device, re-determines a gain factor of an E-DPDCH according to the gain factor configuration information, so that the re-determined gain factor of the E-DPDCH to be decreased, which can degrade performance of the E-DPDCH, so that a case in which the performance of the E-DPDCH becomes excessively good does not occur, thereby reducing problems such as interference to a network and an impact on a network capacity that are caused by excessively good performance of the E-DPDCH. This is applicable to various scenarios in which the performance of the E-DPDCH needs to be degraded.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A power adjustment method, comprising:
   determining an increment of a signal-to-interference ratio target value of a serving cell of a user equipment (UE) according to a difference between pilot signal power of a macro base station and pilot signal power of a micro base station, wherein the serving cell of the UE is at least one of a macro cell in which the macro base station is located and a micro cell in which the micro base station is located; and
   increasing the signal-to-interference ratio target value by the increment; and
   sending an increased signal-to-interference ratio target value to a base station in the serving cell of the UE, so that the base station in the serving cell of the UE controls the UE to increase transmit power of a high speed dedicated physical control channel (HS-DPCCH).

2. The method according to claim 1, wherein, before determining the increment of the signal-to-interference ratio target value, the method further comprises:
   receiving the pilot signal power that is reported by the UE and is of the macro base station, and the pilot signal power that is reported by the UE and is of the micro base station; or
   receiving the pilot signal power of the macro base station that is reported by the macro base station, and receiving the pilot signal power of the micro base station that is reported by the micro base station.

3. The method according to claim 1, wherein determining the increment of the signal-to-interference ratio target value comprises:
   using the difference between the pilot signal power of the macro base station and the pilot signal power of the micro base station as a parameter of a preset first function; and
   calculating the increment of the signal-to-interference ratio target value of the serving cell of the UE by using the first function, wherein the first function is a decreasing function of the difference between the pilot signal power of the macro base station and the pilot signal power of the micro base station.

4. The method according to claim 1, wherein determining the increment of the signal-to-interference ratio target value comprises:
   determining that the UE is located in a soft handover area in which the macro cell serves as the serving cell and the micro cell serves as a non-serving cell; and
   determining the increment of the signal-to-interference ratio target value of the macro cell according to the difference between the pilot signal power of the macro base station and the pilot signal power of the micro base station.

5. The method according to claim 1, wherein, after increasing the signal-to-interference ratio target value by the increment, the method further comprises sending gain factor configuration information to the UE, so that the UE re-determines a gain factor of an enhanced dedicated physical data channel (E-DPDCH) according to the gain factor configuration information, wherein the re-determined gain factor of the E-DPDCH is less than a gain factor of the E-DPDCH that is determined by the UE before the UE receives the gain factor configuration information.

6. The method according to claim 5, further comprising sending the gain factor configuration information to the base station in the serving cell of the UE, so that the base station in the serving cell of the UE re-determines a mapping relationship between a data block length and the gain factor of the E-DPDCH according to the gain factor configuration information.

7. The method according to claim 5, wherein the gain factor configuration information is a first reference gain factor and the first reference gain factor is less than a second reference gain factor used by the UE before the UE receives the gain factor configuration information.

8. The method according to claim 5, wherein the gain factor configuration information comprises a first primary reference gain factor and a first secondary reference gain factor, wherein the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information.

9. The method according to claim 5, wherein the gain factor configuration information is a second function that is used to decrease the gain factor of the E-DPDCH that is determined by the UE before the UE receives the gain factor configuration information.

10. The method according to claim 5, wherein the gain factor configuration information is a third function that is used to decrease a second reference gain factor used for determining, by the UE, the gain factor of the E-DPDCH before the UE receives the gain factor configuration information, wherein the second reference gain factor is a parameter of the third function.

11. A network side device, comprising:
a processor, configured to determine an increment of a signal-to-interference ratio target value of a serving cell of a user equipment (UE) according to a difference between pilot signal power of a macro base station and pilot signal power of a micro base station, and to increase the signal-to-interference ratio target value by the increment, wherein the serving cell of the UE is at least one of a macro cell in which the macro base station is located and a micro cell in which the micro base station is located; and
a transmitter, configured to send a signal-to-interference ratio target value increased by the increment to a base station in the serving cell of the UE, so that the base station in the serving cell of the UE controls the UE to increase transmit power of a high speed dedicated physical control channel (HS-DPCCH).

12. The network side device according to claim 11, further comprising a receiver, configured to, before the processor determines the increment, receive the pilot signal power that is reported by the UE and is of the macro base station and the pilot signal power that is reported by the UE and is of the micro base station, or to receive the pilot signal power of the macro base station that is reported by the macro base station, and receive the pilot signal power of the micro base station that is reported by the micro base station.

13. The network side device according to claim 11, wherein the processor is configured to use the difference between the pilot signal power of the macro base station and the pilot signal power of the micro base station as a parameter of a preset first function, and to calculate the increment of the signal-to-interference ratio target value of the serving cell of the UE by using the first function, wherein the first function is a decreasing function of the difference between the pilot signal power of the macro base station and the pilot signal power of the micro base station.

14. The network side device according to claim 11, wherein the processor is configured to determine that the UE is located in a soft handover area in which the macro cell serves as the serving cell and the micro cell serves as a non-serving cell, and to determine the increment of the signal-to-interference ratio target value of the macro cell according to the difference between the pilot signal power of the macro base station and the pilot signal power of the micro base station.

15. The network side device according to claim 11, wherein the transmitter is further configured to, after the processor increases the signal-to-interference ratio target value by the increment, send gain factor configuration information to the UE, so that the UE re-determines a gain factor of an enhanced dedicated physical data channel (E-DPDCH) according to the gain factor configuration information, wherein the re-determined gain factor of the E-DPDCH is less than a gain factor of the E-DPDCH that is determined by the UE before the UE receives the gain factor configuration information.

16. The network side device according to claim 15, wherein the transmitter is further configured to send the gain factor configuration information to the base station in the serving cell of the UE, so that the base station in the serving cell of the UE re-determines a mapping relationship between a data block length and the gain factor of the E-DPDCH according to the gain factor configuration information.

17. The network side device according to claim 15, wherein the gain factor configuration information is a first reference gain factor, and the first reference gain factor is less than a second reference gain factor used by the UE before the UE receives the gain factor configuration information.

18. The network side device according to claim 15, wherein the gain factor configuration information comprises a first primary reference gain factor and a first secondary reference gain factor, wherein the first primary reference gain factor is less than a second primary reference gain factor used by the UE before the UE receives the gain factor configuration information, and the first secondary reference gain factor is less than a second secondary reference gain factor used by the UE before the UE receives the gain factor configuration information.

19. The network side device according to claim 15, wherein the gain factor configuration information is a second function that is used to decrease the gain factor of the E-DPDCH that is determined by the UE before the UE receives the gain factor configuration information.

20. The network side device according to claim 15, wherein the gain factor configuration information is a third function that is used to decrease a second reference gain factor used for determining, by the UE, the gain factor of the E-DPDCH before the UE receives the gain factor configuration information, wherein the second reference gain factor is a parameter of the third function.

* * * * *